(12) United States Patent
Andrews et al.

(10) Patent No.: US 11,627,004 B1
(45) Date of Patent: Apr. 11, 2023

(54) APPARATUS THAT CONVERTS POWER OVER ETHERNET POWER AND COMMUNICATION TO USB DATA AND POWER ON A USB TYPE C CONNECTOR

(71) Applicants: Tyler Andrews, Austin, TX (US); Jacky Deng, Shenzhen (CN)

(72) Inventors: Tyler Andrews, Austin, TX (US); Jacky Deng, Shenzhen (CN)

( * ) Notice: Subject to any disclaimer, the term of this patent is extended or adjusted under 35 U.S.C. 154(b) by 62 days.

(21) Appl. No.: 16/930,076

(22) Filed: Jul. 15, 2020

Related U.S. Application Data (60) Provisional application No. 62/875,445, filed on Jul. 17, 2019.

(51) Int. Cl.
*H04L 12/10* (2006.01)
*G06F 13/42* (2006.01)

(52) U.S. Cl.
CPC .......... *H04L 12/10* (2013.01); *G06F 13/4282* (2013.01); *G06F 2213/0042* (2013.01)

(58) Field of Classification Search
CPC .......... G06F 1/266; G06F 1/26; G06F 3/1221; G06F 13/4282; G06F 13/387; G06F 13/42; G06F 2213/0042; G06F 13/4221; G06F 13/4068; H04L 12/10; H04L 69/08; H04L 12/40045
USPC ...................................... 710/106, 8; 713/300
See application file for complete search history.

(56) References Cited

U.S. PATENT DOCUMENTS

| | | | |
|---|---|---|---|
| 6,823,480 B1* | 11/2004 | Brown | G06F 11/325 714/E11.207 |
| 8,990,470 B1* | 3/2015 | Sala | G06F 13/4022 710/305 |
| 11,055,244 B1* | 7/2021 | Langner | G06F 13/4282 |
| 2006/0164447 A1* | 7/2006 | Poole | B41J 29/393 347/5 |
| 2007/0255885 A1* | 11/2007 | Bohm | G06F 13/4022 710/316 |
| 2012/0191894 A1* | 7/2012 | Sasaki | G06F 13/387 710/313 |
| 2012/0289080 A1* | 11/2012 | Huang | H01R 29/00 439/502 |

(Continued)

OTHER PUBLICATIONS

Flaherty, Nick, "First Power over Ethernet Splitter for USB-C Power Delivery", May 14, 2018, eeNewsPowerManagement, retrieved from the Internet on Nov. 11, 2021 at <https://www.eenewspower.com/news/first-power-over-ethernet-splitter-usb-c-power-delivery>.
*

(Continued)

*Primary Examiner* — Faisal M Zaman
(74) *Attorney, Agent, or Firm* — Plager Schack LLP; Mark H. Plager; Alexis J. Saenz (57) ABSTRACT

An apparatus converts incoming Power over Ethernet signals into power and data communications under the USB type C protocol standards for use with USB type C connections. Embodiments include a control circuit with programmed processes that facilitate negotiation when a USB-C device connector is attempting to communicate with for example, an Ethernet power source. The control circuit identifies the power delivery and communication profiles associated with a USB type C connected device and controls the Power over Ethernet source signal for compatibility with the device's charging profile and compliance under different IEEE standards.

14 Claims, 10 Drawing Sheets

(56) References Cited

U.S. PATENT DOCUMENTS

| | | | | |
|---|---|---|---|---|
| 2012/0314720 | A1* | 12/2012 | Lee | H04L 49/30 370/474 |
| 2013/0301301 | A1* | 11/2013 | Fischer | H04L 12/413 363/15 |
| 2015/0180244 | A1* | 6/2015 | Jung | H02J 7/00036 320/107 |
| 2015/0311753 | A1* | 10/2015 | Scifres | G06F 1/266 713/300 |
| 2015/0331821 | A1* | 11/2015 | Liston | G06F 13/387 710/106 |
| 2016/0105038 | A1* | 4/2016 | Chi | H02J 7/00036 320/107 |
| 2016/0359405 | A1* | 12/2016 | Li | H02H 9/00 |
| 2016/0370835 | A1* | 12/2016 | Erickson | G06F 13/385 |
| 2016/0378704 | A1* | 12/2016 | Adamson | G06F 13/364 710/104 |
| 2017/0154001 | A1* | 6/2017 | Filser | G06F 13/364 |
| 2017/0250828 | A1* | 8/2017 | Buchanan | H02J 3/02 |
| 2018/0026711 | A1* | 1/2018 | Pruecklmayer | H04B 7/24 370/352 |
| 2018/0060270 | A1* | 3/2018 | Schnell | G06F 13/4022 |
| 2018/0131283 | A1* | 5/2018 | Ono | H02J 1/00 |
| 2018/0183254 | A1* | 6/2018 | Park | G06F 3/01 |
| 2018/0219635 | A1* | 8/2018 | Sipes, Jr. | H04L 12/6418 |
| 2018/0239410 | A1* | 8/2018 | Paparrizos | H02J 7/342 |
| 2018/0267586 | A1* | 9/2018 | Jung | H02J 7/0048 |
| 2018/0341315 | A1* | 11/2018 | Suganuma | G06F 1/266 |
| 2019/0064879 | A1* | 2/2019 | Jeansonne | G06F 1/1632 |
| 2019/0157816 | A1* | 5/2019 | Duan | H01R 24/64 |
| 2019/0238706 | A1* | 8/2019 | Sakai | H04N 1/00907 |
| 2019/0279540 | A1* | 9/2019 | Trachtenberg | G09F 9/3026 |
| 2019/0327099 | A1* | 10/2019 | Vanich | G06F 1/266 |
| 2020/0351547 | A1* | 11/2020 | Sivertsen | H04L 12/10 |
| 2021/0109878 | A1* | 4/2021 | Jiang | H04R 5/033 |

OTHER PUBLICATIONS

"Universal Serial Bus Type-C Cable and Connector Specification", Revision 1.0, Aug. 11, 2014, USB 3.0 Promoter Group.*

* cited by examiner

APPARATUS THAT CONVERTS POWER OVER ETHERNET POWER AND COMMUNICATION TO USB DATA AND POWER ON A USB TYPE C CONNECTOR

CROSS-REFERENCE TO RELATED APPLICATIONS

This application claims benefit under 35 U.S.C. § 119(e) of U.S. Provisional Application having Ser. No. 62/875,445 filed Jul. 17, 2019, which is hereby incorporated by reference herein in its entirety.

BACKGROUND

The embodiments herein relate generally to Power Over Ethernet (POE) systems.

There are devices to convert Power Over Ethernet into USB older standards, however, they do not address the Power Delivery protocol or the new USB standards associated with USB Type C. Generally, other devices either convert the power between the older standards or connect them as a hub.

Embodiments of the subject technology address these problems.

SUMMARY

In one aspect, an apparatus for converting Power over Ethernet (PoE) power and communication to Universal Serial Bus (USB) data and USB usable power through a USB type C connector, is disclosed. The apparatus comprises: a PoE port; a USB type C device connection port; a first controller connected between the PoE port and the USB type C device connection port, wherein the first controller is configured to determine a communication protocol between the USB type C device and the PoE port; a second controller connected between the PoE port and the USB type C device connection port, wherein the second controller is configured to negotiate a device charging power profile between a USB type C device connected to the USB type C device connection port and a PoE source connected to the PoE port; and a third controller between the first controller and the second controller and including an output connected to the USB type C device connection port, wherein the third controller is configured to convert PoE power signals from the PoE source into a power charging signal for the USB type C device.

In another aspect, an apparatus for converting Power over Ethernet (PoE) power and communication to Universal Serial Bus (USB) data and USB usable power through a USB type C connector, is disclosed. The apparatus comprises: a PoE port; a USB type C device connection port; and a control circuit connecting the PoE port to the USB type C device connection port, wherein the control circuit is configured to: process Ethernet signals of varying PoE standards from the PoE port into a USB type C data format, negotiate a device charging power profile between a USB type C device connected to the USB type C device connection port and a PoE source connected to the PoE port, identify a PoE standard associated with the PoE source, determine a communication protocol between the USB type C device and the PoE port based on the identified PoE source, connect the USB type C device to the PoE source in response to negotiating the device charging power profile and determining the communication protocol, and convert PoE signals from the PoE source into a power charging signal for the USB type C device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

In general, embodiments of the disclosed subject technology provide data and power from a power source to USB type C (sometimes referred to as "USB-C") connected devices through a converter apparatus and conversion process. In the general realm of USB technology, some manufacturers use proprietary or non-standard operating specifications which makes it a challenge for one converter to satisfy negotiations between devices connected by a USB connector. While many devices use USB-C connectors, the USB standard for USB-C is continually developing which causes incompatible communication between various devices. Devices using a USB type C connection may have dissimilar control requirements and thus, there may not be compatibility between each device and a power source when using a conventional converter.

Some embodiments of the subject disclosure may provide a universal converter for devices using a USB type C connector. As may be appreciated, aspects of the embodiments provide both the power delivery standard power to the USB-C device and the USB data at varying data rates using Power Over Ethernet and TCP/IP communication in an integrated package. In some aspects, processes are implemented which facilitate negotiation when a USB-C device connector is attempting to communicate with for example, a power source. In an exemplary embodiment, the power source is an Ethernet connection from which power is drawn.

Figure 1A:
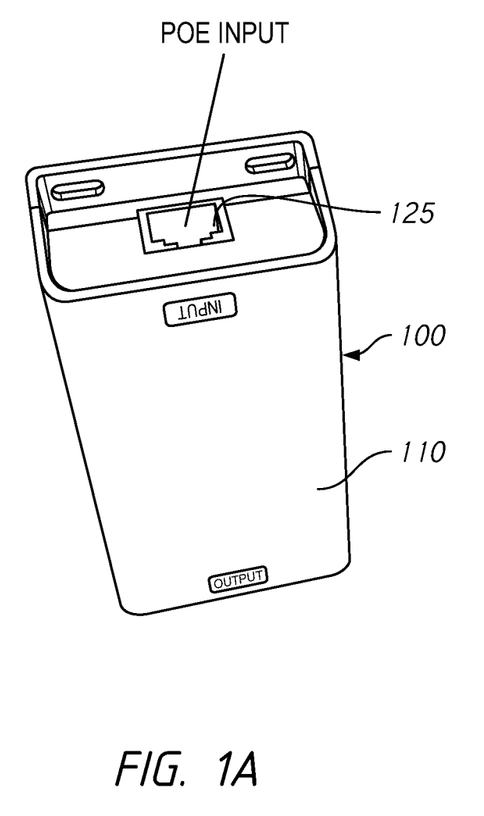
FIG. 1A shows a perspective front view of a power over Ethernet converter apparatus for USB type C connections according to an embodiment of the subject technology.
Figure 1B:
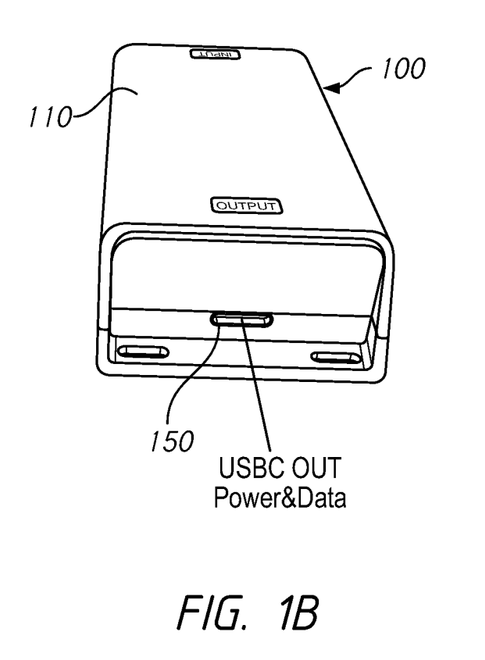
FIG. 1B shows a perspective rear view of the PoE apparatus of FIG. 1A.

Referring to FIGS. 1A and 1B, a converter apparatus 100 (sometimes referred to generally as the "apparatus 100" or the "converter "100"") for converting power and communication to Universal Serial Bus (USB) data and USB usable power on a USB type C connector is shown according to an exemplary embodiment. In an exemplary embodiment, the power source is based on Power over Ethernet (PoE). In some embodiments, the converter 100 may be a device module which includes a case 110. The case 110 may include a first port 125 and a second port 150 for receiving plugs from two different devices. In an exemplary embodiment, the first port 125 is configured to receive a PoE plug from a PoE cable connected to an Ethernet source device (not shown). The port 150 may be configured to receive a USB type C connector plug (not shown). The port 150 may comprise a 24-pin receptacle as is used by USB-C ports however, some embodiments may include a different pin structure without departing from the novel aspects of the subject technology. The case 110 also includes hidden internal components electrically connecting the port 125 to the port 150. In an exemplary embodiment, the first port 125 may be an input port receiving PoE power from the PoE source. The second port 150 may be an output port which provides PoE signals converted into a USB-C readable format that may be used for reading data and charging power to the USB type C connected device (not shown).

In general, the converter 100 connects to a passive PoE, IEEE 802.3af, IEEE 802.3at, IEEE 802.3bt, or other Power Over Ethernet protocol. Once a USB Type C device is connected to the port 150, the converter 100 negotiates a powering profile and communication protocol. Once the converter 100 determines a matching power and data protocol it connects the device to the Ethernet network and delivers power compatible to it.

Figure 2:
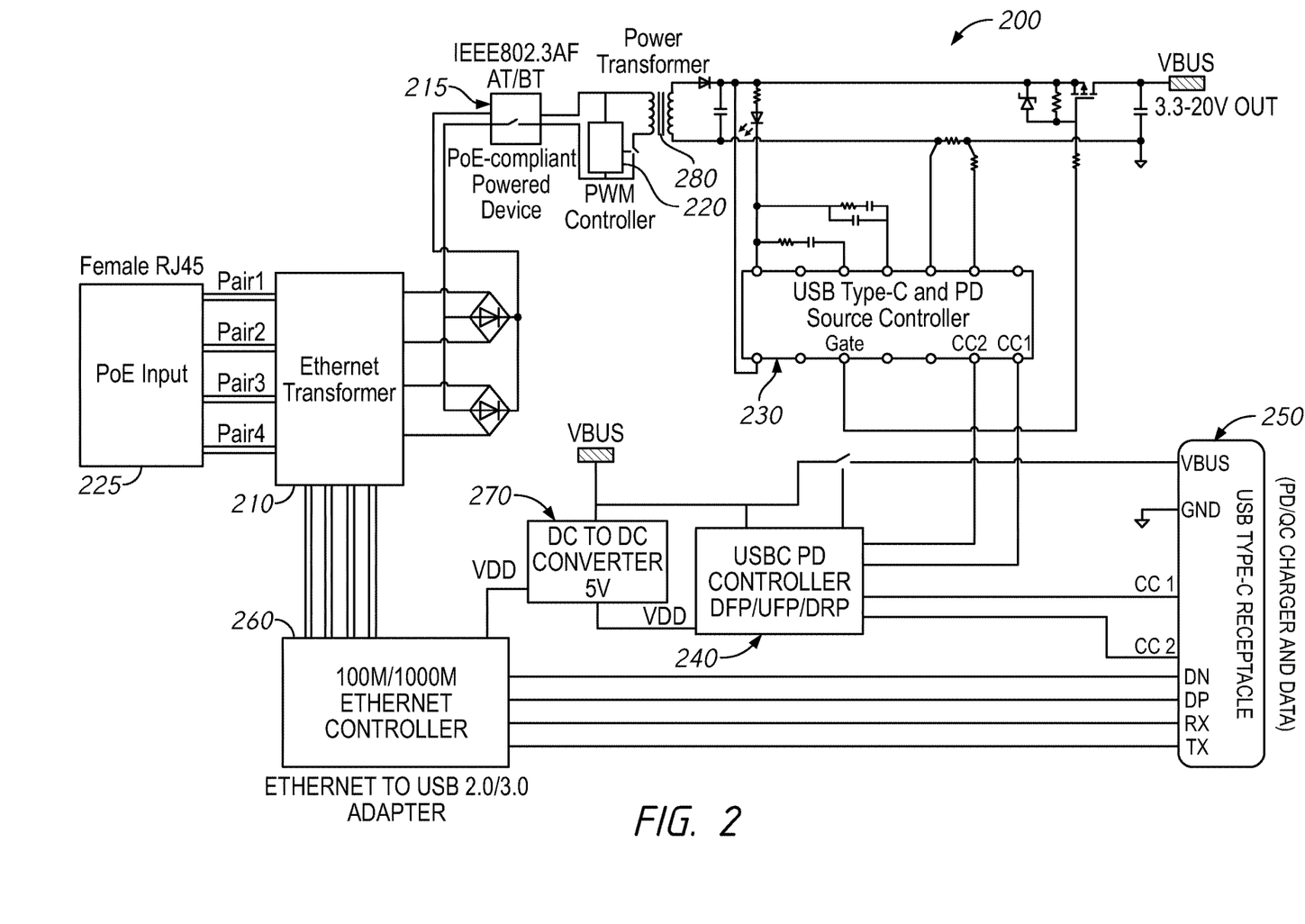
FIG. 2 is a schematic, block diagram of internal elements of the apparatus of FIG. 1A according to an embodiment of the subject technology.
Figure 3:
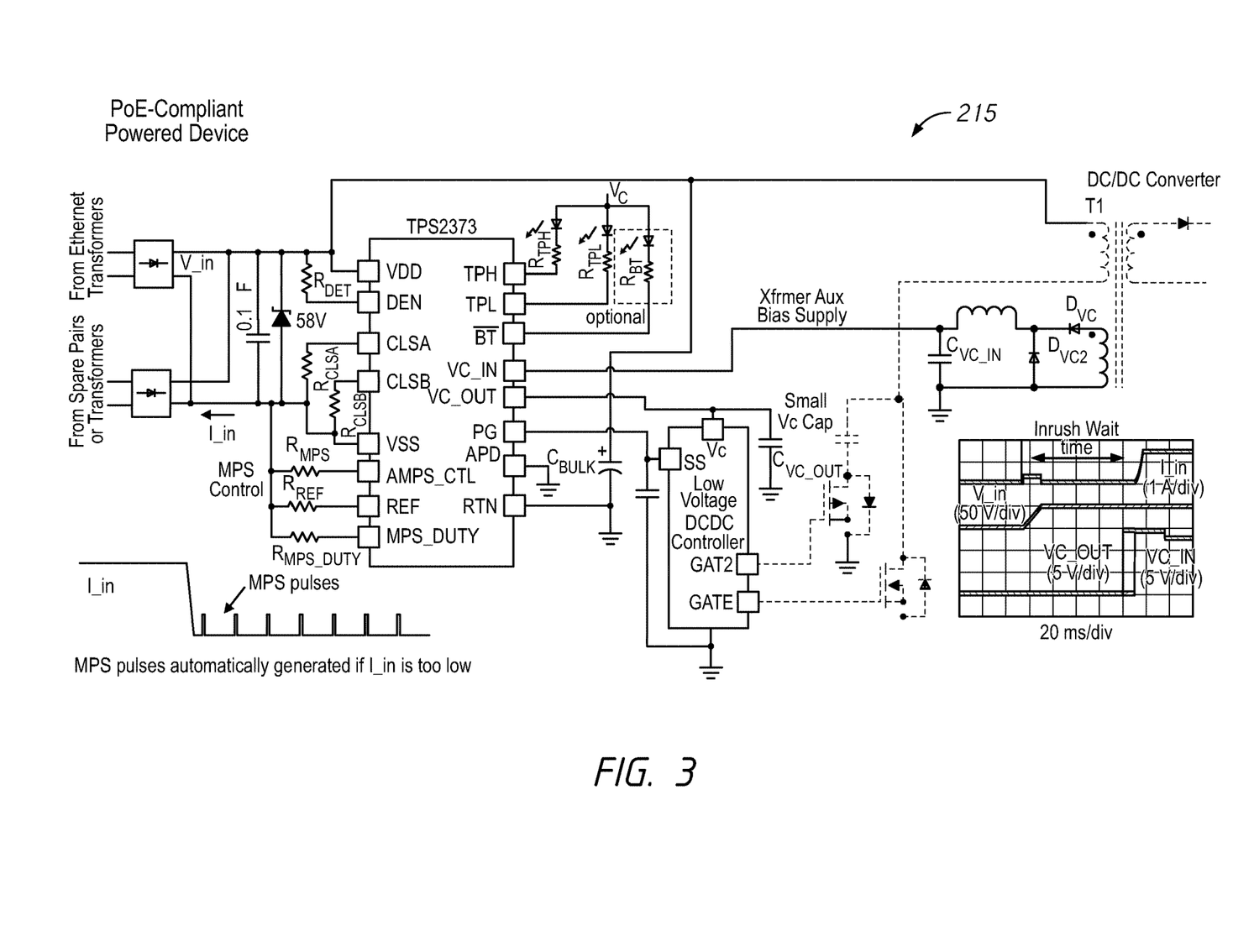
FIG. 3 is a schematic, circuit diagram of a general PoE compliant device that may be connected to the PoE converter apparatus of FIG. 1A in accordance with embodiments.

Referring now to FIG. 2, a control circuit 200 for converting PoE signals into USB power and/or data signal outputs is shown according to an exemplary embodiment. The PoE port 225 may be analogous to the port 125 of FIG. 1A. On the opposite side of the circuit 200 from the port 225 is a USB port 250. In an exemplary embodiment, the USB port 250 may be a USB type C connection port. The USB port 250 may be analogous to the port 150 of FIG. 1B. In an exemplary embodiment, the control circuit 200 may include three controller modules. In the following description, a "first controller module" may refer to an Ethernet controller module 260, "a second controller module" may refer to a USB type C and power delivery (PD) source controller module 230, and a "third controller module" may refer to a USBC PD port state controller 240.

Figure 6:
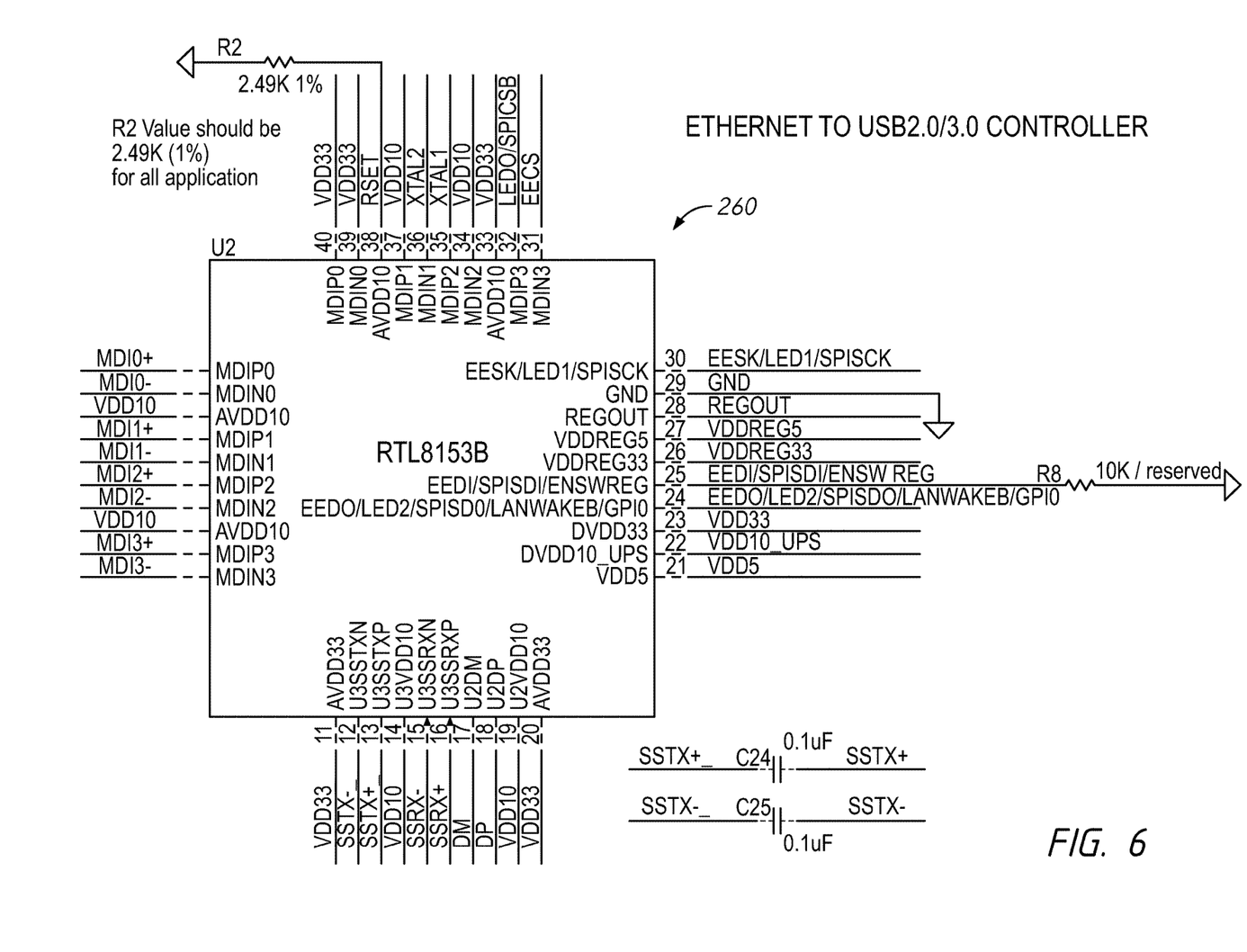
FIG. 6 is a schematic, circuit diagram of an Ethernet to USB controller in the PoE converter apparatus circuit of FIG. 2 in accordance with embodiments.
Figure 7:
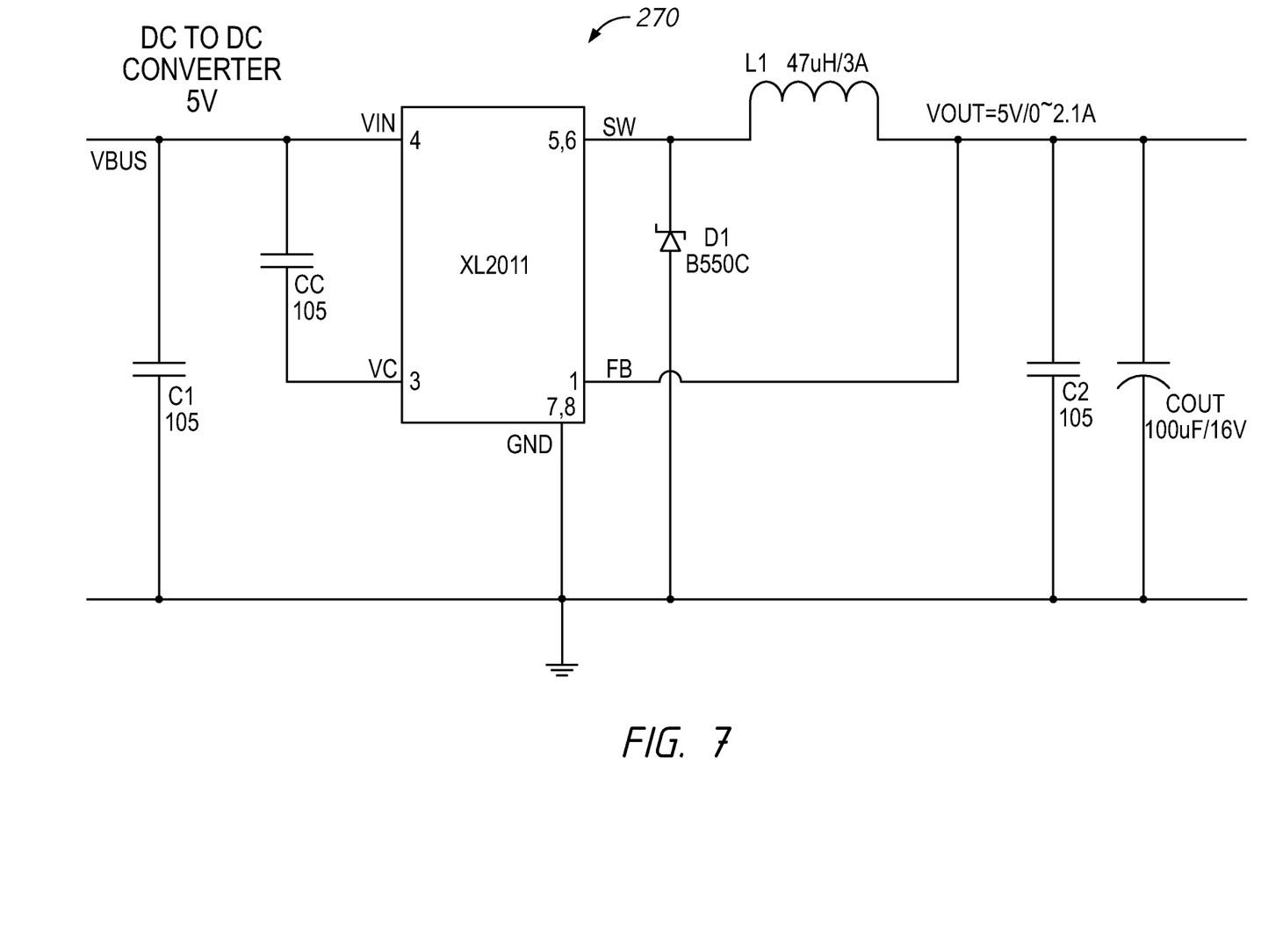
FIG. 7 is a schematic, circuit diagram of a DC to DC converter module in the PoE converter apparatus circuit of FIG. 2 in accordance with embodiments.

The data path in the circuit generally follows a path between the PoE input 225 to the Ethernet transformer 210 to the Ethernet controller module 260 and out the USB port 250 to the USB type C device. In some embodiments, the first controller module, the Ethernet controller module 260, determines the communication protocol between the PoE input port 225 and the USB port 250. Once the protocol is determined, the Ethernet controller module 260 processes incoming Ethernet data signals into USB data formats and in an exemplary USB type C formats. The first controller module 260 may be connected to the Ethernet transformer 210. In some embodiments, the Ethernet controller 260 may comprise a processing chip or integrated circuit, an exemplary embodiment of which is seen in FIG. 6. The output of the Ethernet controller module 260 may be connected to the USB port 250. The Ethernet controller module 260 may control data transfer at 100 Mbps or 1000 Mbps and may include an Ethernet to USB 2.0/3.0 adapter. In some embodiments, a DC to DC converter 270 may be connected to the Ethernet controller 260. The DC to DC converter 270 may be seen in greater detail in FIG. 7 according to an exemplary embodiment. The Ethernet controller 260 may communicate out the USB port 250 to the USB type C device.

The power path in the circuit 200 generally converts PoE input signals into power signals depending on the originating source device. Along the power path, in between the PoE port 225 and the USB port 250, the circuit may include an Ethernet transformer 210, the USB type C and power delivery (PD) source controller module 230, the USBC PD port state controller 240, and a DC to DC converter 270. Some embodiments may include a flyback converter section between the Ethernet transformer 210 and the PD source controller module 230. The flyback converter may include a pulse width modulation (PWM) controller 220 coupled to a power transformer 280. The PWM controller 220 and power transformer 280 may convert the DC power from 48 volt DC to the DC power specified from the PD source controller 230. The PWM controller 220 and power transformer 280 may be connected to a microchip 215 which controls the proper protocols for the Vbus aspects of the circuit. The microchip 215 may be a Powered Device (PD) element of a Power Over Ethernet system. While the embodiment illustrated shows a TPS2373 model chip, it will be understood that other chip types may be substituted without departing from the scope of the subject technology. For example, another type of chip that may be used is a MP8008. Still yet, other types may be used. The microchip 215 may negotiate with a PoE switch (not shown) or a midspan (not shown) to provide the type of Power Over Ethernet required by the device. The microchip 215 negotiates the amount of power the device requires with respect to the power the switch or midspan can deliver. The standards are nominally:

PoE–15 watts
PoE+–30 watts
uPOE–60 watts
4Pair POE–90 watts

In some embodiments, the PoE receptacle 225 may be a female RJ45 receptacle which may include four pairs of lines receiving signals from the PoE source. The PoE port 225 may be connected to the Ethernet transformer module 210. The Ethernet transformer 210 may split power to the PoE-compliant powered device 215 leading eventually to the USB type C and PD source controller module 230 and the data to the Ethernet controller 260. In some embodiments, the microchip 215 may include an integrated circuit (IC). The microchip 215 IC may connect with the PoE powered device 220 and PWM controller which outputs power to the DC to DC converter 270, which in turn controls an output of power to the USB type C and PD source controller module 230. The controller 230 may connect to the USBC PD port state controller 240 which communicates through the USB port 250 to the USB type C device.

Figure 4:
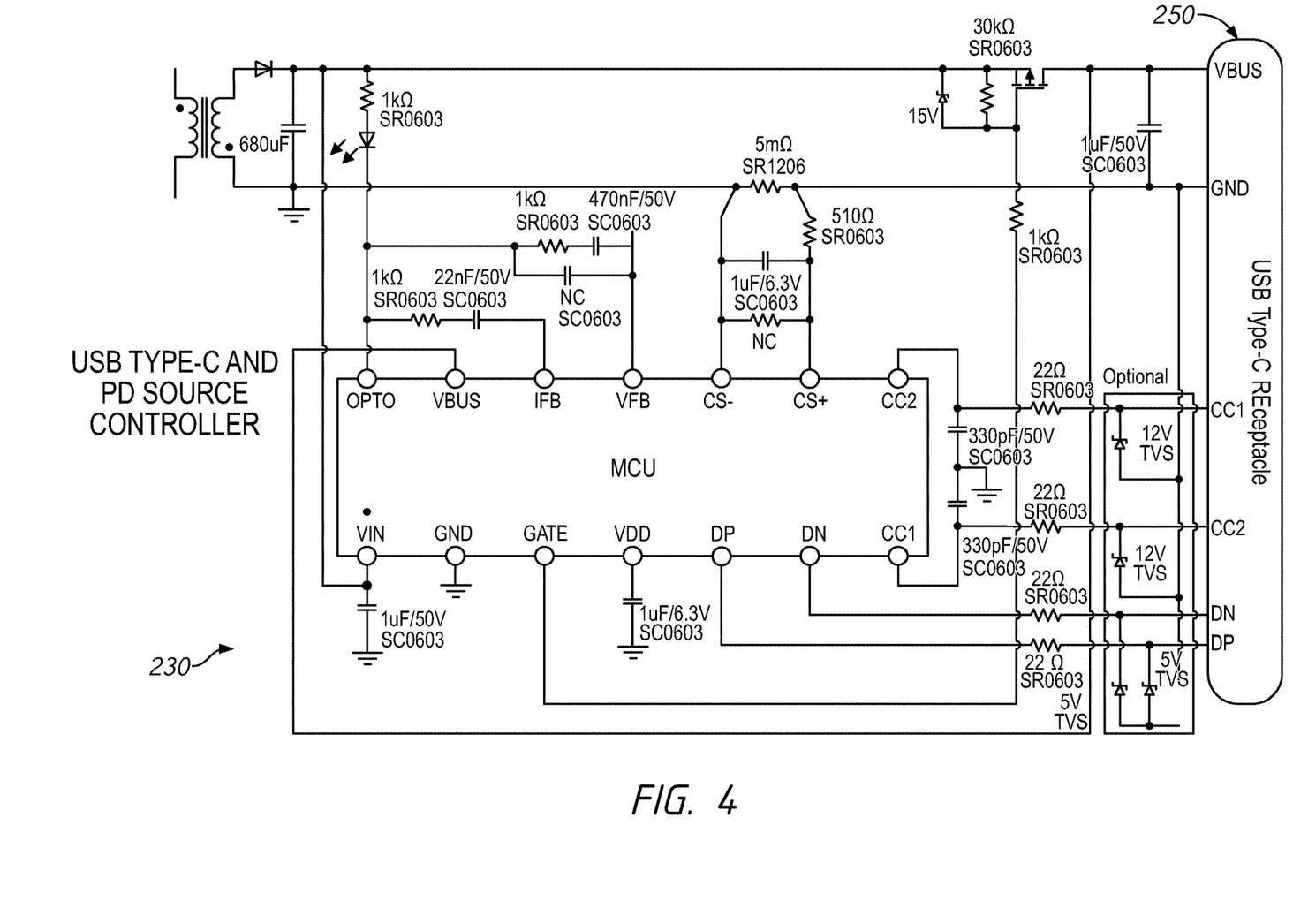
FIG. 4 is a schematic, circuit diagram of a USB Type-C and PD source controller in the PoE converter apparatus circuit of FIG. 2 in accordance with embodiments.

In an exemplary embodiment, the second controller 230, (the USB type C and power delivery (PD) source controller module) (sometimes referred to generally, as the "controller 230")) may be located generally between the PoE port 225 and the USB port 250. A circuit embodiment of the controller 230 is shown in FIG. 4. In general, the controller 230 may be configured to manage the power delivery profiles delivered to the USB port 250. In an exemplary embodiment, the controller 230 steps down the voltage level (for example, 24V) from the flyback converter section to a voltage level the circuit needs for the power delivery profiles determined for the device plugged into the USB port 250. In some embodiments, the controller 230 includes a processor or microchip unit (MCU) programmed with executable instructions to perform processes, steps, or routines described herein. In an exemplary embodiment, the controller 230 may be programmed or configured to negotiate a device charging power profile between a connected USB type C device connected to the USB type C device connection port 250 and a PoE source connected to the PoE port 225.

As may be appreciated, negotiating a charging profile between different USB type C connected devices and different PoE sources presents several challenges that aspects of the subject technology address to provide universal compatibility. While, the USB type C standard provides developers a framework for the USB-C implementation, practically speaking the functional applications still have room for developers to make crucial decisions that cause compatibility issues, especially in the space of power negotiation with data communication and most especially during boot up or restarting after a software update. As will then be appreciated, there are aspects to the subject technology which provide universal compatibility of the USB-C and PoE Standards among devices.

In one aspect, the controller 230 addresses Quick Charge (QC) profiles. Manufacturers, including for example, Samsung®, Lenovo®, and others, have non-standard USB Type C devices that use a Quick Charge power negotiation process rather than the USB-C Power Delivery (PD) negotiation. In some embodiments, the USB Type-C and PD Source Controller 230 generates a test process sending signals to the USB-C connected device to determine whether the device requires a QC profile during power negotiations. Then, in order to maintain compatible Power Over Ethernet standards, for example, under IEEE 802.3af (15 watts at the PSE), the controller 230 establishes a charging profile of 5 volt 2.6 amp. For other devices' QC profile, the controller 230 may store a set of QC profiles for backward compatibility. When another device with a QC process is identified, its QC profile may be retrieved and the associated charging profile may be implemented.

In another aspect, the controller 230 resolves non-uniformity in the implementation of the Power Delivery Output (PDO) of different manufacturers. The different PDO of different devices causes issues with the IEEE 802.3 standards of PoE. One notable example is that an iPad® Pro Gen 3 has preferred PD profiles of 5 volt 2 amp, 9 volt 2 amp, 15 volt 2 amp. This device will attempt to negotiate a power delivery profile at the highest voltage at 2 amp power draw, defined as Constant Current (CC) mode. While negotiating the available power profiles, an iPad® will choose the highest voltage available. In this case, it will attempt to draw 30 watts of power at 15 volts 2 amp. If the PoE device is only IEEE 802.3at (25.5 watts at the Powered Device-PD), when the Power Sourcing Equipment (PSE), a PoE switch or midspan, detects a power draw over the rated 25.5 watts, it will shut down the PoE port briefly then try to re-establish power. The USB-C device will cycle its charging rapidly with the resets of the PoE. To address this situation, the USB Type-C and PD Source Controller 230 includes executable instructions to request the USB-C device to negotiate in Constant Voltage (CV) mode, for example, 15 volts, and selects from a range of current levels that would: maintain the device's battery charge during normal operations to not drain the battery over time, and remain within the Power Over Ethernet Classes.

Figure 5A:
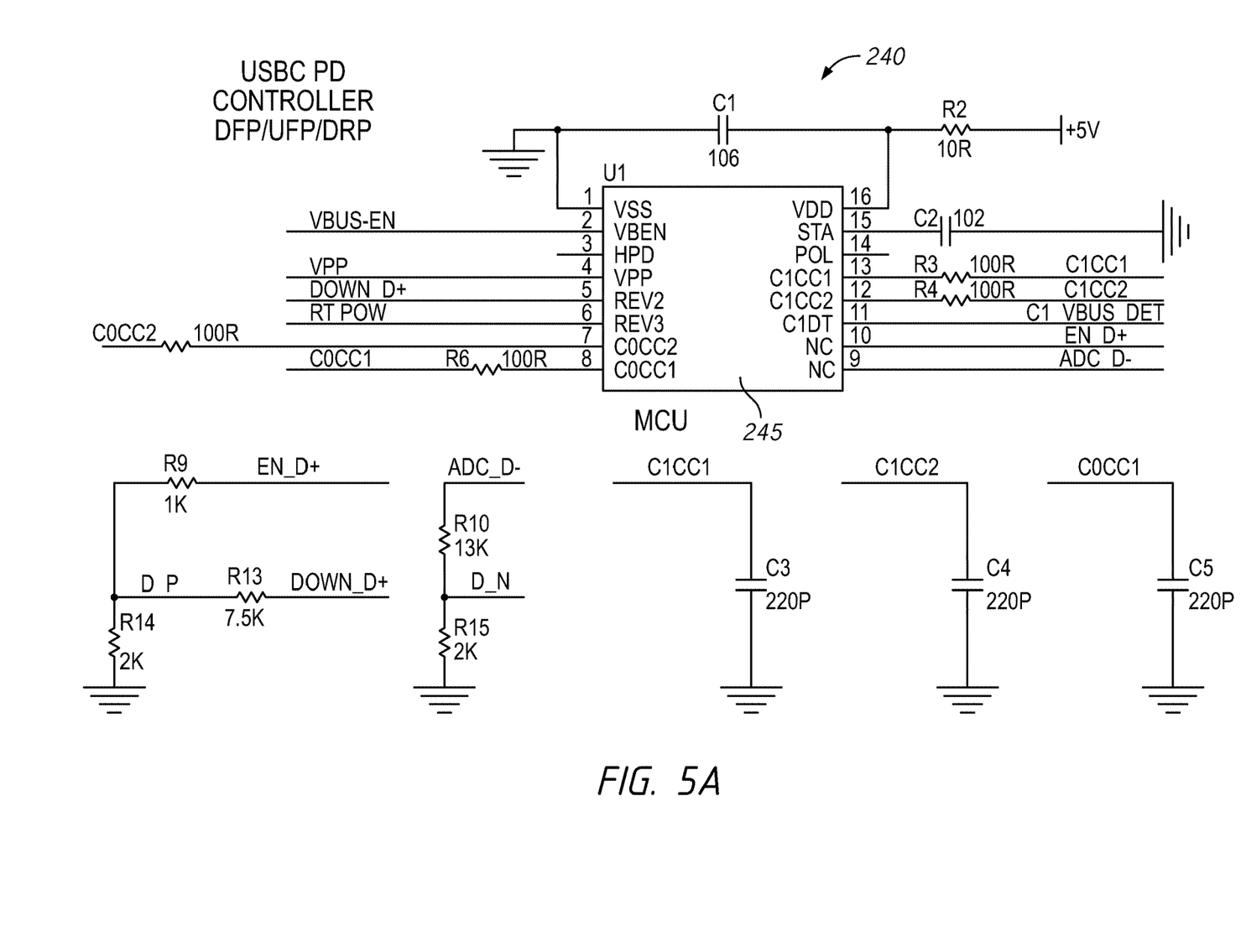
FIG. 5A is a partial schematic, circuit diagram of a USB Type-C PD controller in the PoE converter apparatus circuit of FIG. 2 in accordance with embodiments.
Figure 5B:
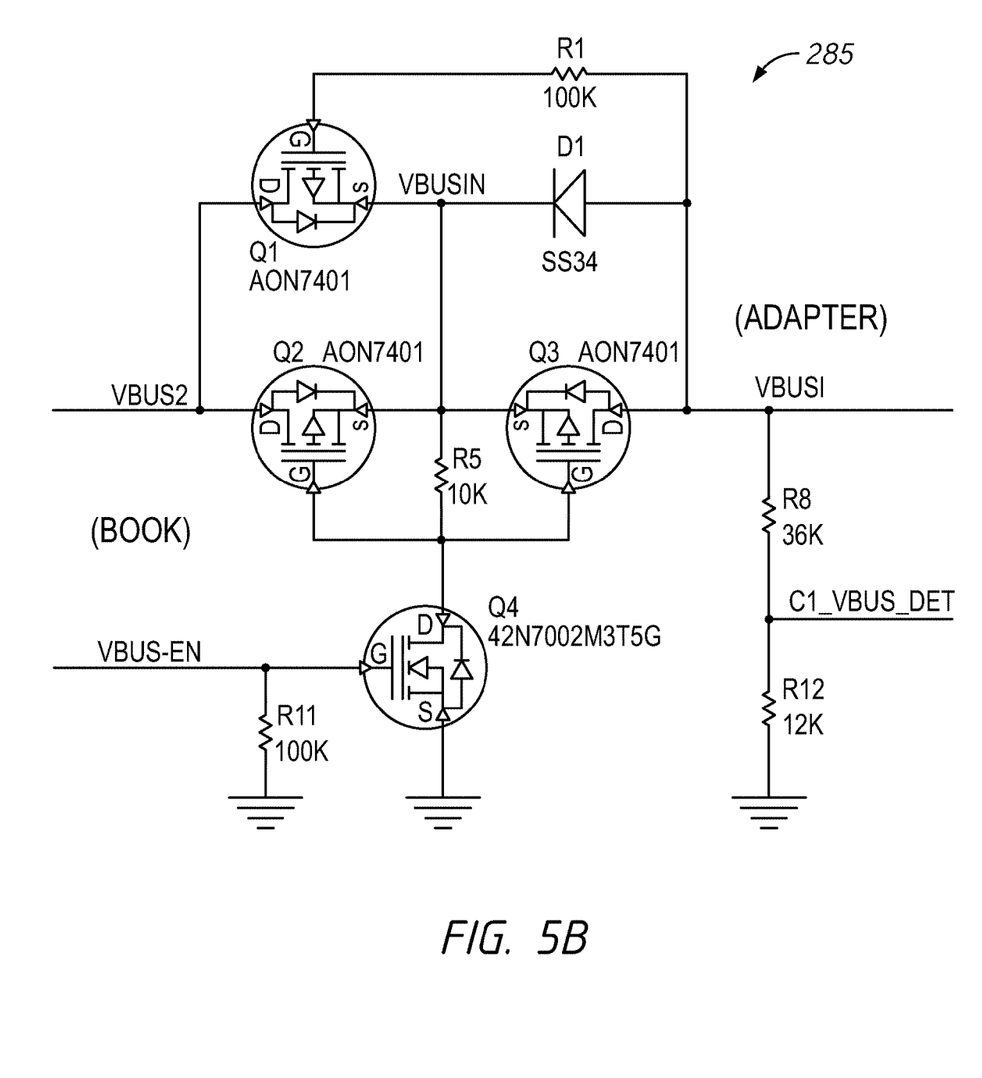
FIG. 5B is a schematic, circuit diagram of another section of the USB Type-C PD controller of FIG. 5A in accordance with embodiments.
Figure 5C:
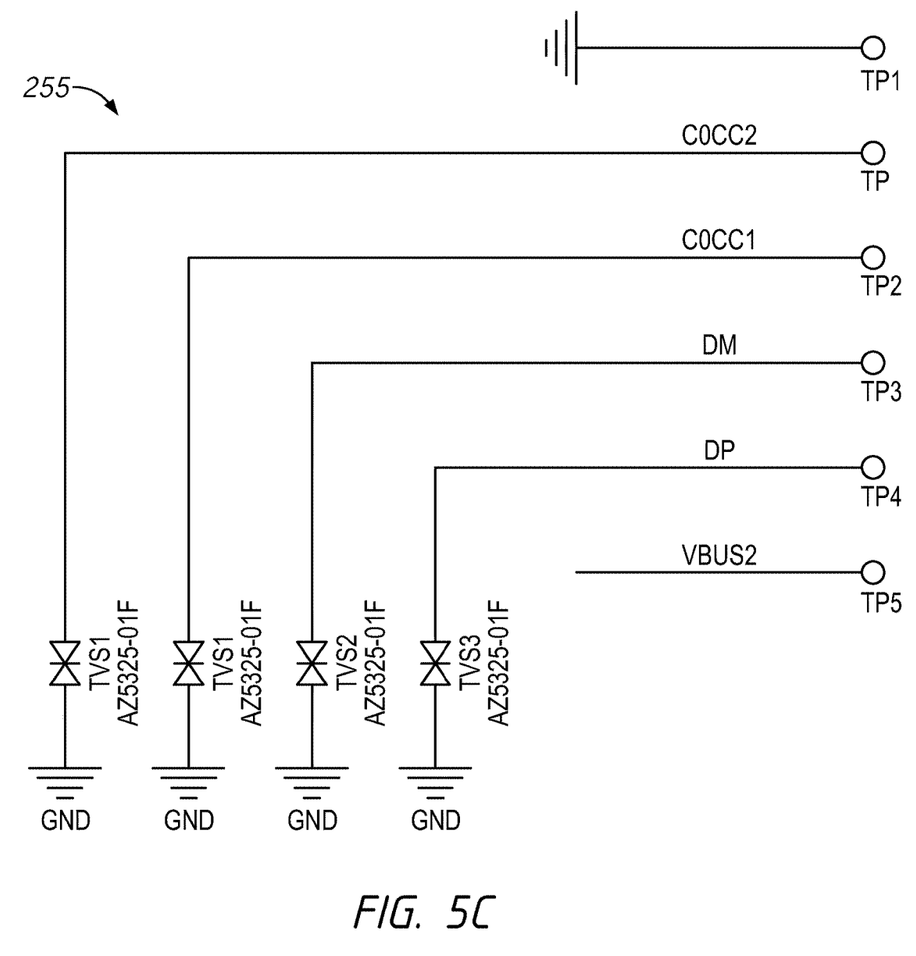
FIG. 5C a schematic, circuit diagram of another section of the USB Type-C PD controller of FIG. 5A in accordance with embodiments.

In some embodiments, the control circuit 200 includes the third controller 240, (the USBC PD port state controller). A circuit embodiment of the controller 240 is shown in FIG. 5A. In some embodiments, the controller 240 includes a processor or microchip unit (MCU) 245 programmed with executable instructions to perform processes, steps, or routines described herein. The USBC PD port state controller 240 may be connected between the PoE port 225 and the USB type C port 250. The USBC PD port state controller 240 may be connected to the controller 230. The PoE port 225 IC communicates a range of PoE protocols with the source device. The USBC PD port state controller 240 communicates a range of power delivery and quick charge protocols with the USB type C device based on the source device.

The USBC PD port state controller 240 may include a dual role port (DRP) which may be configured to activate a dynamic selection of a Downward Facing Port (DFP) or an Upward Facing Port (UFP) state. In some embodiments, the USBC PD port state controller 240 may communicate which port state to use to the USB type C and power delivery (PD) source controller module 230 in communicating between the PoE source and the USB type C device. While many USB-C devices will establish themselves dynamically as a host (DFP), certain devices including the Samsung Tab Active® can only operate as a device (UFP). This creates incompatibility issues for other converter devices that are preconfigured for only one mode. However, in some embodiments of the subject technology, the USBC PD port state controller 240 establishes a Cyclic Redundancy (CRC) routine that allows the converter 100 to negotiate DFP and UFP dynamically. The routine (process) identifies which USB status to use based on the USB device and allows USB devices to establish the USB status from which they can accept data.

As will be appreciated, aspects of the disclosed apparatus allow multiple PoE applications over one or more USB type C ports. In addition, some embodiments include a system comprising one or more USB type C to multiple Power Over Ethernet ports connections through a PoE switch or midspan. For example, the apparatus may be mounted in enclosures and paired with tablets to create Point of Sale stations, kiosks, digital signage, check-in stations, A/V controllers, cloud conferencing controllers, security system displays, and other tablet-based applications. The apparatus may also be paired with new USB Type C cameras, sensors, or IoT devices to enable smart networks.

Figure 8:
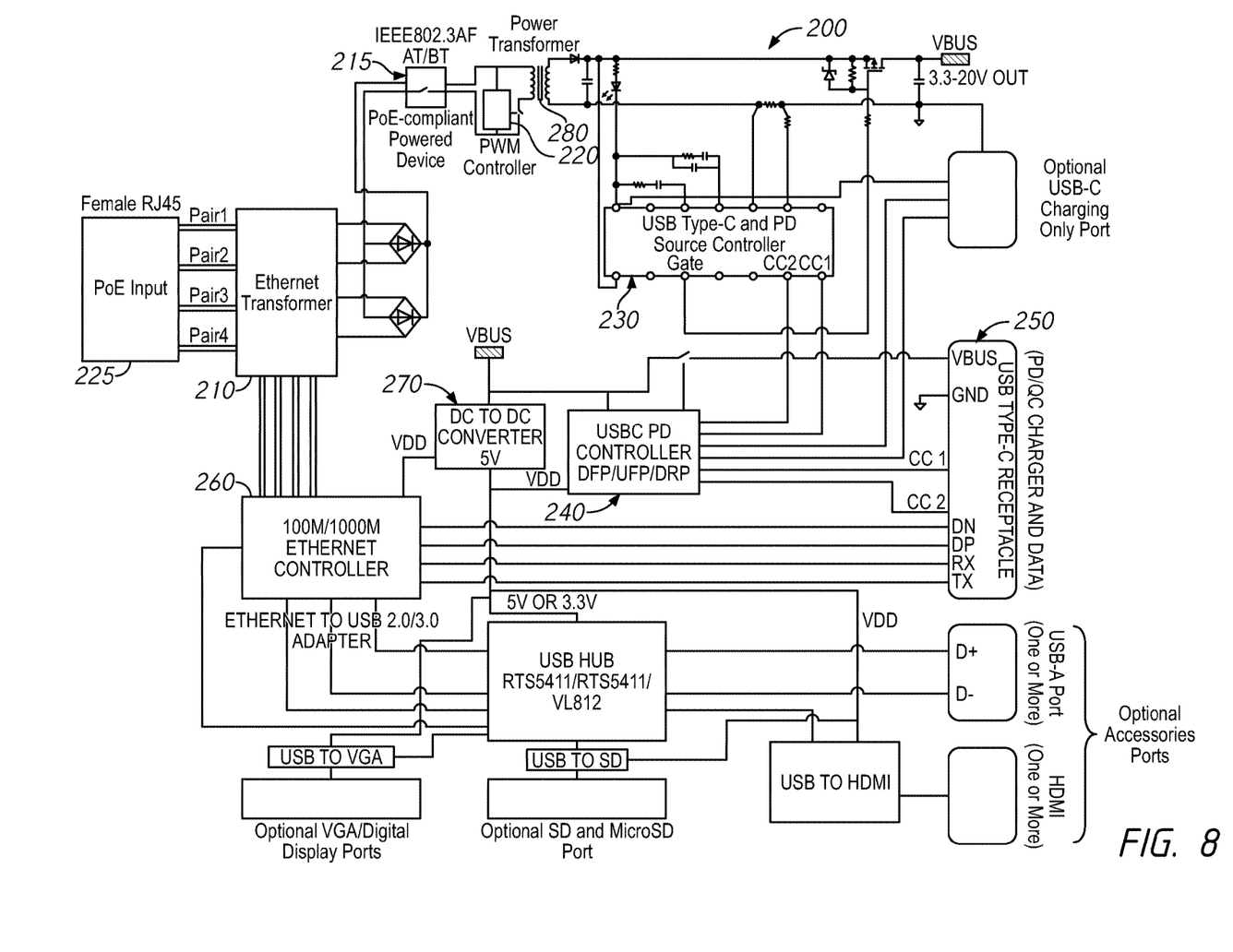
FIG. 8 is a schematic, block diagram of a power over Ethernet converter apparatus for multiple type USB port connections in accordance with another embodiment of the subject technology.

Referring now to FIG. 8, another embodiment of the control circuit 200 for converting PoE signals into USB power and/or data signal outputs is shown. In FIG. 8, the apparatus may be configured to accept connection of plugs of other types in addition to USB type C. For example, a USB port A, VGA, digital display port, a SD and microSD port, and/or a HDMI port may be connected to the control circuit 200 so that other devices of different plug connections may be powered over Ethernet. For sake of illustration, not all known plug types capable of PoE charging are shown but should be understood to be contemplated as capable of being part of the invention. The additional plug type connections will be referred to as "non-USB-C" type plugs for sake of reference herein. The control circuit 200 is similar to the embodiment disclosed above in FIG. 2, except that non-USB-C ports may be connected to the Ethernet controller 260. The Ethernet controller 260 operates in the same manner as described above providing communication protocols to the devices connected via the non-USB-C type ports. An optional USB-C only port may be configured to provide two separate functions. The optional USB-C only port may act as a power supply port, meaning PoE port 225 will not draw power. PoE port 225 will deliver the data and the new USB-C power will provide the power through the PD controllers. In this respect, the system will allow a user to choose whether to power with PoE or with a USB-C charging port. The optional USB-C only port may also act as a power sourcing port allowing the user to simply charge a device while the PoE port 225 provides the power as well as power and/or data to the rest of the ports.

Persons of ordinary skill in the art may appreciate that numerous design configurations may be possible to enjoy the functional benefits of the inventive systems. For example, microchip 215 described above was mentioned as having other possible chip types substituted for the type shown. Any other specific component model shown may similarly be substituted for another model and should not limit the component to any particular model type. For example, FIG. 6 shows a specific chip model so that one in the art may be provided the information to replicate the technology given the pin out configuration, but it will be understood that other models may be used and the pin out configuration may be adjusted accordingly. Thus, given the wide variety of configurations and arrangements of embodiments of the present invention the scope of the invention is reflected by the breadth of the claims below rather than narrowed by the embodiments described above.

As will be appreciated by one skilled in the art, aspects of the disclosed invention may be embodied as an apparatus, a system, a method or process, a circuit, a module, or a computer program product. Accordingly, aspects of the disclosed invention may take the form of an entirely hardware embodiment, an entirely software embodiment (including firmware, resident software, micro-code, etc.) or an embodiment combining software and hardware aspects that may all generally be referred to herein as a "module", "circuit", or "system." For example, some of the elements disclosed above were referred to as a "controller" which may take the form of a circuit of various electronic elements, an integrated circuit, a system on a chip (SoC), an application specific integrated circuit (ASIC), a standalone processor, microchip, or microcontroller unit or any combination of the aforementioned. Furthermore, aspects of the disclosed invention may take the form of a computer program product embodied in one or more computer readable media having computer readable program code embodied thereon on any of the aforementioned forms of a controller.

Thus, the claims are not intended to be limited to the aspects shown herein, but are to be accorded the full scope consistent with the language of claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An apparatus for converting Power over Ethernet (PoE) power and communication to Universal Serial Bus (USB) data and USB usable power through a USB type C connector, comprising:
    a PoE port;
    a USB type C device connection port;
    a first controller connected between the PoE port and the USB type C device connection port, wherein the first controller includes a processing chip or integrated circuit configured to:
        determine a communication protocol between the USB type C device connection port and the PoE port, and
        convert Ethernet signals from the PoE port into a USB type C data format;
    a second controller connected between the PoE port and the USB type C device connection port, wherein the second controller includes:
        a first microchip,
        an input pin on the first microchip for receiving a power input signal from the PoE port, and
        a first control configuration output pin on the first microchip, wherein the first microchip is configured to negotiate a device charging power profile, using the power input signal, between a USB type C device connected to the USB type C device connection port and a PoE source connected to the PoE port;

a third controller between the first controller and the second controller and including:
   a second microchip,
      a first control configuration input pin on the second microchip receiving data from the first control configuration output pin on the first microchip,
   a second control configuration output pin located on the second microchip connected to a second control configuration input pin located on the USB type C device connection port, and wherein
   the second microchip includes a dual role port (DRP) function configured to activate a dynamic selection of a Downward Facing Port (DFP) or an Upward Facing Port (UFP) state based on a message from the third controller to the second controller identifying a device type of the USB type C device connected to the USB type C device connection port,
wherein the second controller and third controller are configured to manage conversion of PoE power signals from the PoE source into a power charging signal through the second control configuration input pin located on the USB type C device connection port for the USB type C device; and wherein
the USB type C device connection port is configured to provide the Ethernet signals converted into the USB type C format as readable data and charging power to the USB type C device.

2. The apparatus of claim 1, wherein the second controller is further configured to request the USB type C device to negotiate in a constant voltage mode.

3. The apparatus of claim 2, wherein the second controller is further configured to select from an operating current level that maintains a battery charge of the USB type C device and remains within a stored PoE class standard during charging.

4. The apparatus of claim 1, wherein the second controller is further configured to negotiate with a plurality of power delivery output (PDO) volt/amp ratings.

5. The apparatus of claim 1, wherein the device charging profile is based on a quick charge (QC) protocol.

6. The apparatus of claim 1, wherein the first controller is configured to process Ethernet signals of varying PoE standards into the USB type C data format.

7. The apparatus of claim 1, wherein the first controller is configured to process a range of PoE protocols communicated to the USB type C device.

8. The apparatus of claim 1, wherein the second controller is configured to test whether the USB type C device requires a quick charge (QC) protocol.

9. An apparatus for converting Power over Ethernet (PoE) power and communication to Universal Serial Bus (USB) data and USB usable power on a USB type C connector, comprising:

a PoE port;
a USB type C device connection port; and
a control circuit connecting the PoE port to the USB type C device connection port, wherein the control circuit is configured to:
process Ethernet signals of varying PoE standards from the PoE port into a USB type C data format,
negotiate, through an input pin on a first microchip receiving a power input signal from the PoE port, a device charging power profile between a USB type C device connected to the USB type C device connection port and a PoE source connected to the PoE port, through a first control configuration output pin on the first microchip and through a second control configuration output pin located on a second microchip connected to a second control configuration input pin on the USB type C device connection port,
identify by the second microchip whether the USB type C device is one of a downward facing port and an upward facing port,
communicate a message from the second microchip to the first microchip of a dynamic selection of one of the downward facing port and the upward facing port associated with the USB type C device,
controlling by the first microchip, the device charging power profile based on the dynamic selection of the downward facing port state and the upward facing port state associated with the USB type C device,
identify a PoE standard associated with the PoE source,
determine a communication protocol between the USB type C device and the PoE port based on the identified PoE source,
connect the USB type C device to the PoE source in response to negotiating the device charging power profile and determining the communication protocol, and
convert PoE signals from the PoE source into a power charging signal for the USB type C device.

10. The apparatus of claim 9, wherein the control circuit is further configured to request the USB type C device to negotiate in a constant voltage mode.

11. The apparatus of claim 10, wherein the control circuit is further configured to select from an operating current level that maintains a battery charge of the USB type C device and remains within a stored PoE class standard during charging.

12. The apparatus of claim 9, wherein the control circuit is further configured to negotiate with a plurality of power delivery output (PDO) volt/amp ratings.

13. The apparatus of claim 9, wherein the device charging profile is based on a quick charge (QC) protocol.

14. The apparatus of claim 9, wherein the control circuit is further configured to test whether the USB type C device requires a quick charge (QC) protocol.

\* \* \* \* \*